US008811407B1

(12) United States Patent
Carothers et al.

(10) Patent No.: US 8,811,407 B1
(45) Date of Patent: Aug. 19, 2014

(54) WEIGHTED DATA PACKET COMMUNICATION SYSTEM

(75) Inventors: Matthew Edwin Carothers, Atlanta, GA (US); Daniel Seth Hogan, Atlanta, GA (US); Elissa Kahalelauniu Babayigit, Norcross, GA (US)

(73) Assignee: Cox Communications, Inc., Atlanta, GA (US)

( * ) Notice: Subject to any disclaimer, the term of this patent is extended or adjusted under 35 U.S.C. 154(b) by 584 days.

(21) Appl. No.: 12/627,670

(22) Filed: Nov. 30, 2009

(51) Int. Cl.
*H04L 12/28* (2006.01)

(52) U.S. Cl.
USPC .................. 370/395.41; 370/395.43; 370/412

(58) Field of Classification Search
None
See application file for complete search history.

(56) References Cited

U.S. PATENT DOCUMENTS

| | | | |
|---|---|---|---|
| 7,003,609 B2 | 2/2006 | Ripy et al. | |
| 7,065,695 B2 | 6/2006 | Cameron et al. | |
| 7,110,359 B1 * | 9/2006 | Acharya | 370/235 |
| 7,164,686 B2 * | 1/2007 | Yuang et al. | 370/412 |
| 7,200,732 B2 | 4/2007 | Ripy et al. | |
| 7,263,063 B2 * | 8/2007 | Sastry et al. | 370/235 |
| 7,277,446 B1 * | 10/2007 | Abi-Nassif et al. | 370/412 |
| 7,599,290 B2 * | 10/2009 | Dos Remedios et al. | 370/230.1 |
| 7,688,734 B2 * | 3/2010 | Hellenthal et al. | 370/235 |
| 7,936,772 B2 * | 5/2011 | Kashyap | 370/414 |
| 7,958,260 B2 * | 6/2011 | Cloonan et al. | 709/240 |
| 7,969,884 B1 * | 6/2011 | Venables et al. | 370/235 |
| 7,983,299 B1 * | 7/2011 | Ma | 370/468 |
| 8,045,563 B2 * | 10/2011 | Lee | 370/395.41 |
| 8,126,038 B2 * | 2/2012 | Duvaut et al. | 375/222 |
| 8,345,691 B2 * | 1/2013 | Lee et al. | 370/395.4 |
| 2004/0090974 A1 * | 5/2004 | Balakrishnan et al. | 370/412 |
| 2005/0047425 A1 * | 3/2005 | Liu et al. | 370/411 |
| 2006/0036520 A1 * | 2/2006 | O'Neill | 705/34 |
| 2008/0095057 A1 * | 4/2008 | Zhou | 370/235 |
| 2008/0095188 A1 * | 4/2008 | Remy et al. | 370/468 |

* cited by examiner

Primary Examiner — Michael J Moore, Jr.
(74) Attorney, Agent, or Firm — Benjamin A. Balser; Balser & Grell IP Law

(57) ABSTRACT

A system for weighted communication of data packets via a data communication network. Data packets from sending devices are selectively transmitted in the upstream direction to recipient devices through the application of weights, or weight factors, which determine the number of data packets from each sending device transmitted upstream relative to the number of data packets from other sending devices during a round robin cycle of such devices. Data packets for delivery to receiving devices are selectively transmitted in the downstream direction to the receiving devices using the application of weights, or weight factors, which determine the number of data packets for each receiving device transmitted downstream relative to the number of data packets for other receiving devices during a round robin cycle of such devices. Weights may be associated with the service tier subscribed to with a communication service provider by an owner/user of a sending and receiving device.

45 Claims, 9 Drawing Sheets

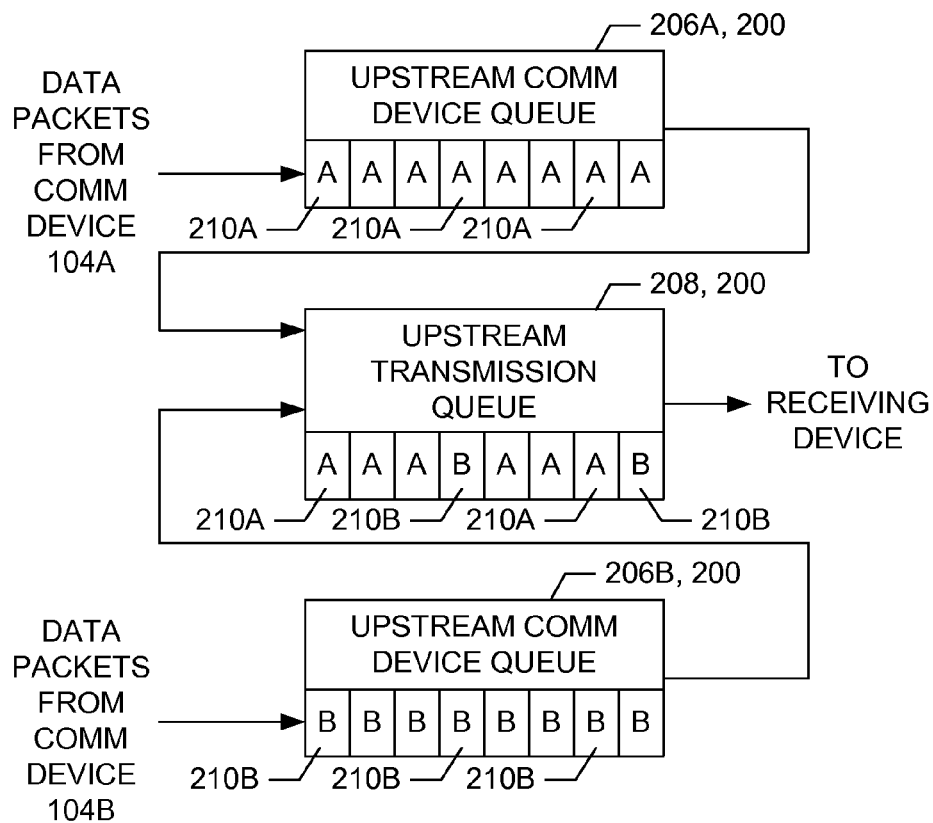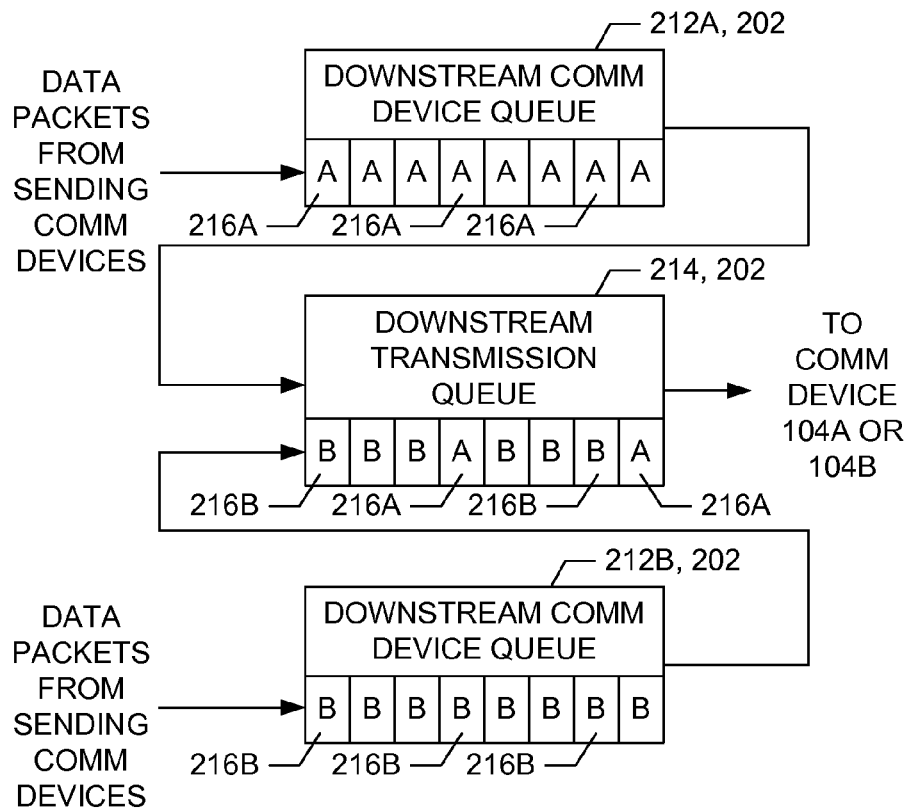

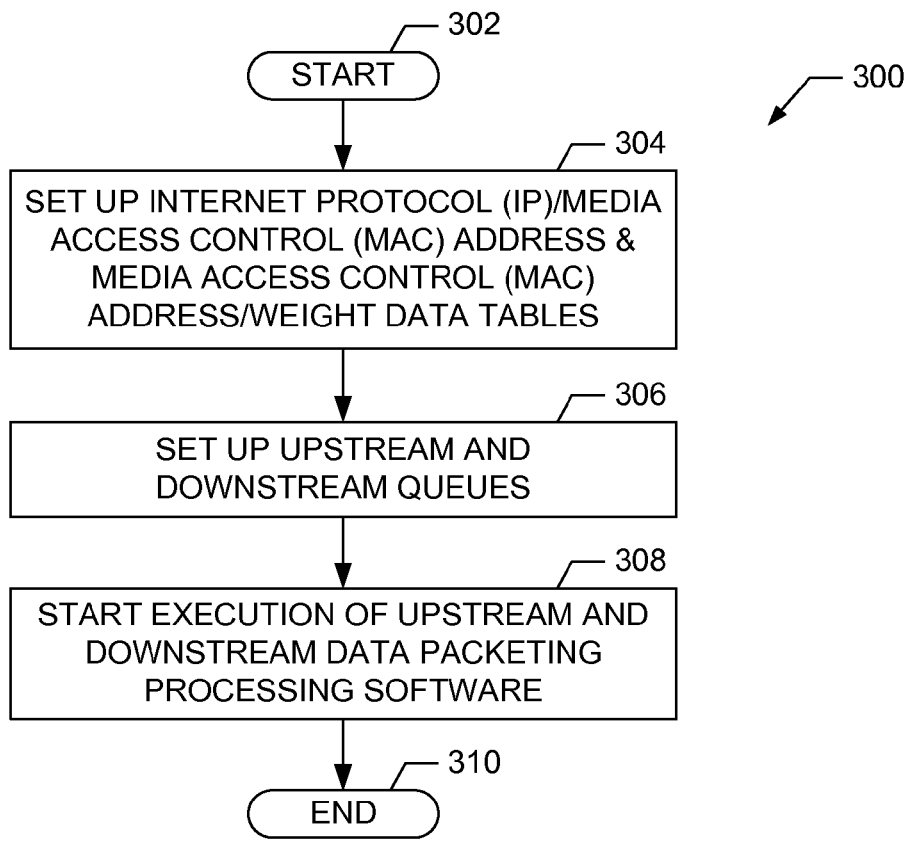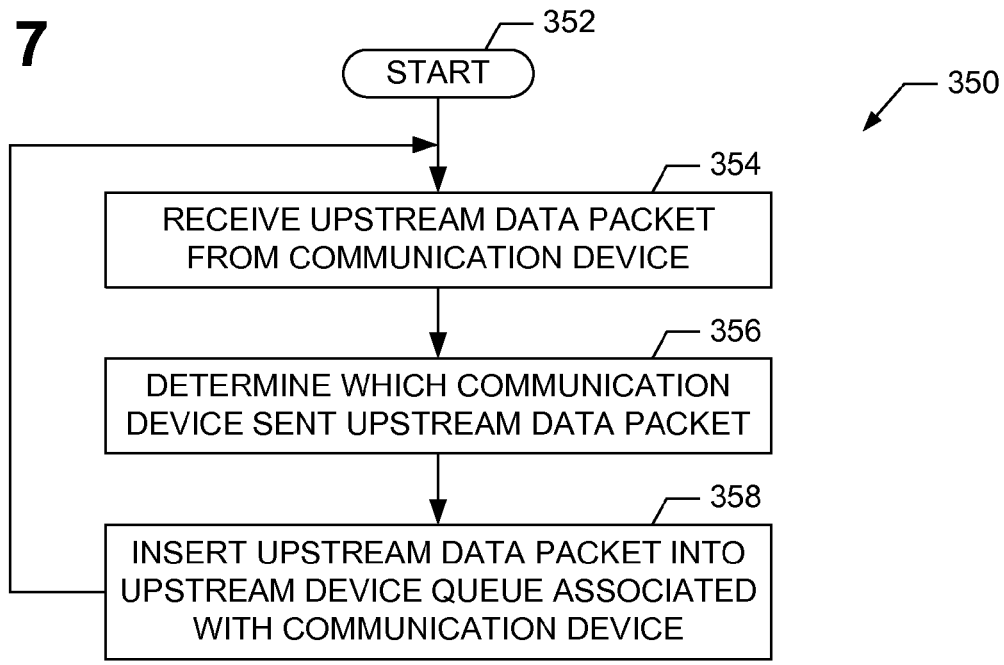

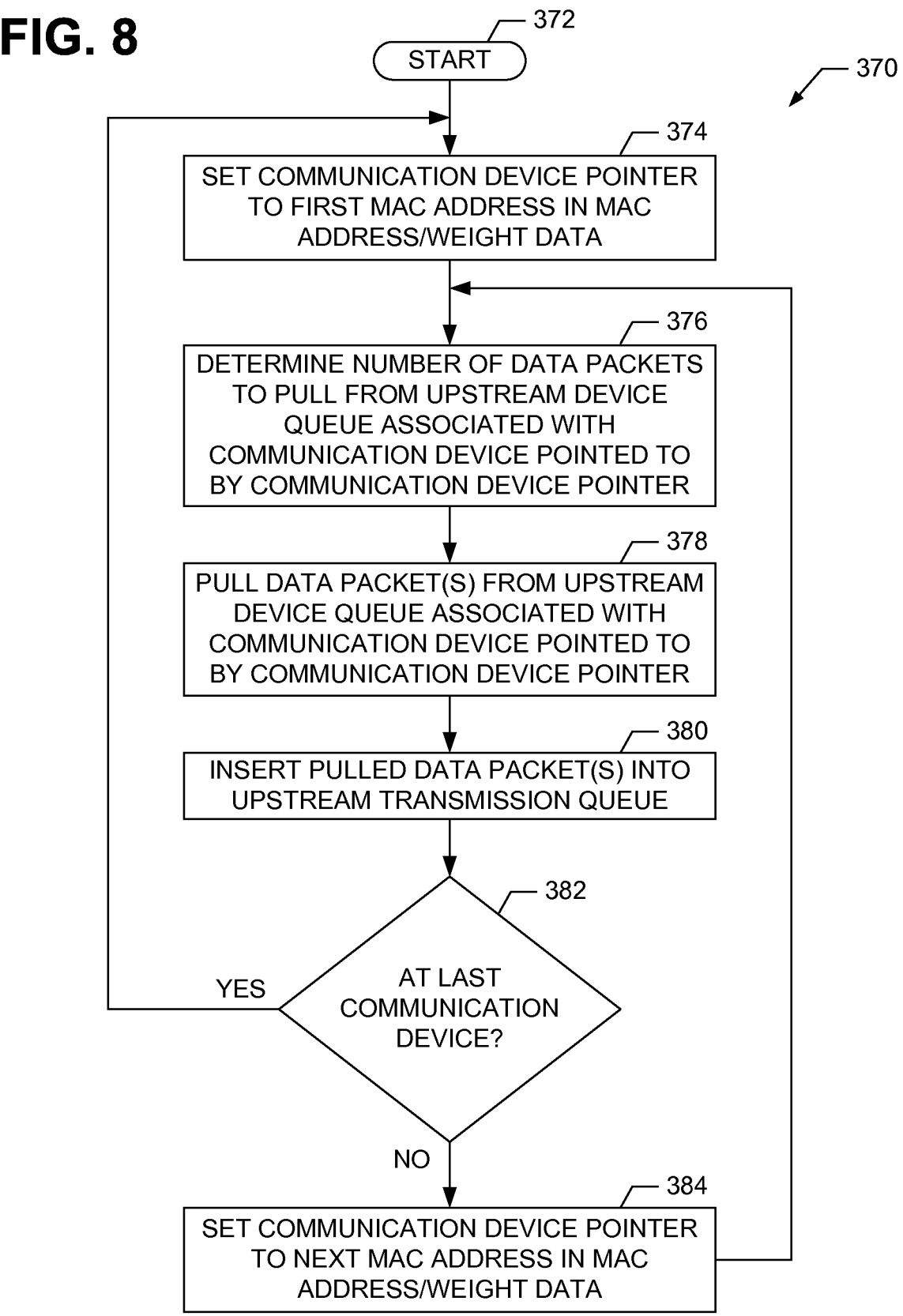

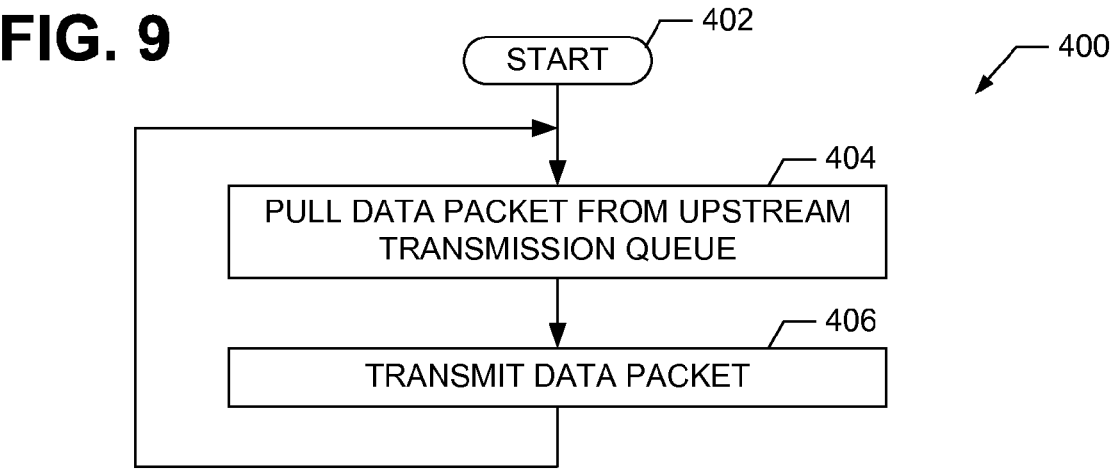
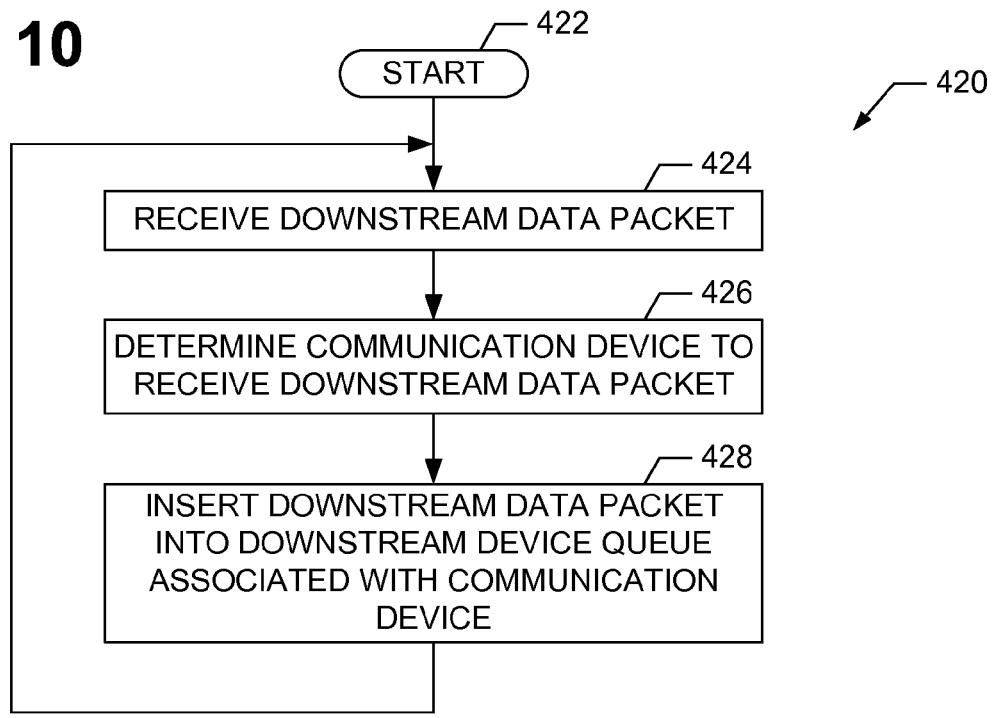

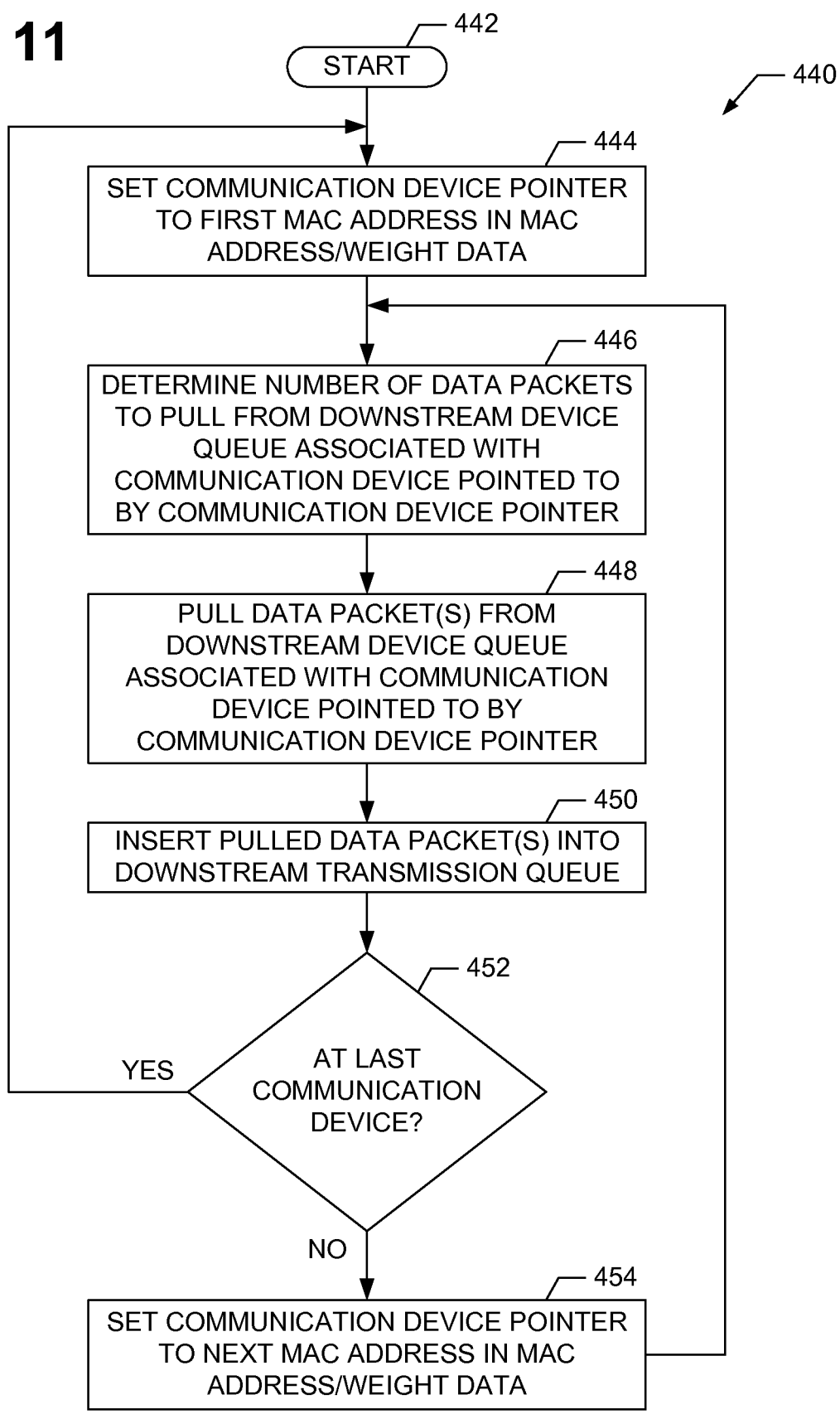

WEIGHTED DATA PACKET COMMUNICATION SYSTEM

FIELD OF THE INVENTION

The present invention relates, generally, to the field of systems, including apparatuses and methods, for communicating data packets via a communication network.

BACKGROUND

In today's telecommunication industry, data communication services are generally provided to customers, or subscribers, by communication service providers having vast communication networks including a variety of routers, switches, and other communication devices configured to provide the data communication services. From a technical perspective, data communication services such as Internet access involve the bi-directional communication of data between subscribers' communication devices and recipients' communication devices via the data communication networks of the subscribers' communication service providers and, perhaps, the data communication networks of other communication service providers. Data is typically encapsulated for upstream or downstream communication, as the case may be, in data packets at a sender's computer or other data communication device. Data packets from a plurality of senders who receive data communication services from the same communication service provider are often communicated from the senders' computers or other data communication devices to a routing communication device such as, but not limited to, a router operated by the communication service provider.

Some routing communication devices place received data packets into a transmission data queue in the order of their receipt to await transmission to respective intended recipients. Data packets are then pulled from the transmission data queue using a first-in, first-out method and are transmitted via the communication service provider's data communication network and the data communication networks of others, as need be, to a computer or other communication device of the data packets' respective intended recipients. Because the data packets may be received from computers or other communication devices of subscribers or senders in a random manner and because the data packets are queued in the order in which they are received, the transmission data queue comprises data packets in a random order. Consequently, the data packets are transmitted to the computers or other communication devices of their respective intended recipients in a random order and may not be received consistently over time, thus creating jitter for the intended recipients. For those intended recipients requiring consistent receipt of data packets, such jitter may be problematic and create other operational difficulties.

In attempt to prevent jitter and ensure more consistent transmission and receipt of data packets, some routing communication devices employ a second level of data packet queuing in which a data queue is uniquely associated with each subscriber or sender with which the routing communication devices are communicatively connected. During operation, when a routing communication device receives data packets from a subscriber or sender's computer or other data communication device, the routing communication device places the data packets in the data queue uniquely associated with the subscriber or sender for output therefrom on a first-in, first-out (FIFO) basis. Then, the routing communication device pulls a data packet from each of the uniquely associated data queues in a continual round robin manner and transmits the data packets via the communication service provider's data communication network and, if necessary, via the data communication networks of others, to a computer or other communication device of the data packets' respective intended recipients. By pulling a data packet from each uniquely associated data queue in a round robin manner, the transmission data queue comprises data packets from each uniquely associated data queue that are not arranged in a random order, but that are instead arranged in the same consistent round robin order in which they are pulled. As a consequence, data packets from subscriber or sender's computer or other data communication devices are received by their intended recipients in a consistent manner over time, thereby reducing and, possibly, eliminating jitter.

While the use of a second level of data packet queuing and round robin filling of a transmission data queue provides for consistent delivery of data packets to their respective intended recipients, such a method ignores that some subscribers pay their communication service providers higher service fees for enhanced data communication rates for upstream data communication, downstream data communication, or both. Ignoring that some subscribers pay higher service fees may not be problematic when data communications are not congested, but such subscribers may take exception during periods of network congestion to not receiving the higher data communication rates for which they are paying.

Therefore, there is a need in the industry for apparatuses and/or methods that provide communication service subscribers with the data communication rates for which they are paying, and that may address other business and/or technological issues associated with current apparatuses and/or methods.

SUMMARY

Broadly described, the present invention comprises a system, including apparatuses and methods, for the weighted communication of data packets via a data communication network. According to the example embodiment described herein, data packets from multiple sending devices are selectively transmitted in the upstream direction to intended recipient devices through the application of weights, or weight factors, which determine the number of data packets from each sending device are transmitted upstream relative to the number of data packets from the other sending devices during a round robin cycle of the sending devices. Also, data packets intended for delivery to multiple receiving devices are selectively transmitted in the downstream direction to the respective receiving devices using the application of weights, or weight factors, which determine the number of data packets for each recipient device that are transmitted downstream relative to the number of data packets intended for other recipient devices during a round robin cycle of the receiving devices. The weight factors are, generally, associated with the tier of service subscribed to with a communication service provider by an owner/user of a sending and receiving device.

Advantageously, the system enables subscribers to receive upstream and downstream data communication rates associated with the tiers of service subscribed to with a communication service provider. In addition, due to the system's method of operation, data packets from sending devices are received by their intended recipients in a consistent manner over time, thereby reducing and, possibly, eliminating jitter.

Other advantages and benefits of the present invention will become apparent upon reading and understanding the present specification when taken in conjunction with the appended drawings.

BRIEF DESCRIPTION OF THE DRAWINGS

FIG. 4 displays a schematic representation of upstream queues of a cable modem termination system in accordance with the example embodiment of the present invention.

FIG. 5 displays a schematic representation of downstream queues of a cable modem termination system in accordance with the example embodiment of the present invention.

FIG. 6 displays a flowchart representation of a cable modem termination system initialization method in accordance with the example embodiment of the present invention.

FIG. 7 displays a flowchart representation of an upstream device queue loading method in accordance with the example embodiment of the present invention.

FIG. 8 displays a flowchart representation of an upstream transmission queue loading method in accordance with the example embodiment of the present invention.

FIG. 9 displays a flowchart representation of an upstream transmission method in accordance with the example embodiment of the present invention.

FIG. 10 displays a flowchart representation of a downstream device queue loading method in accordance with the example embodiment of the present invention.

FIG. 11 displays a flowchart representation of a downstream transmission queue loading method in accordance with the example embodiment of the present invention.

DETAILED DESCRIPTION OF THE DRAWINGS

Figure 1:
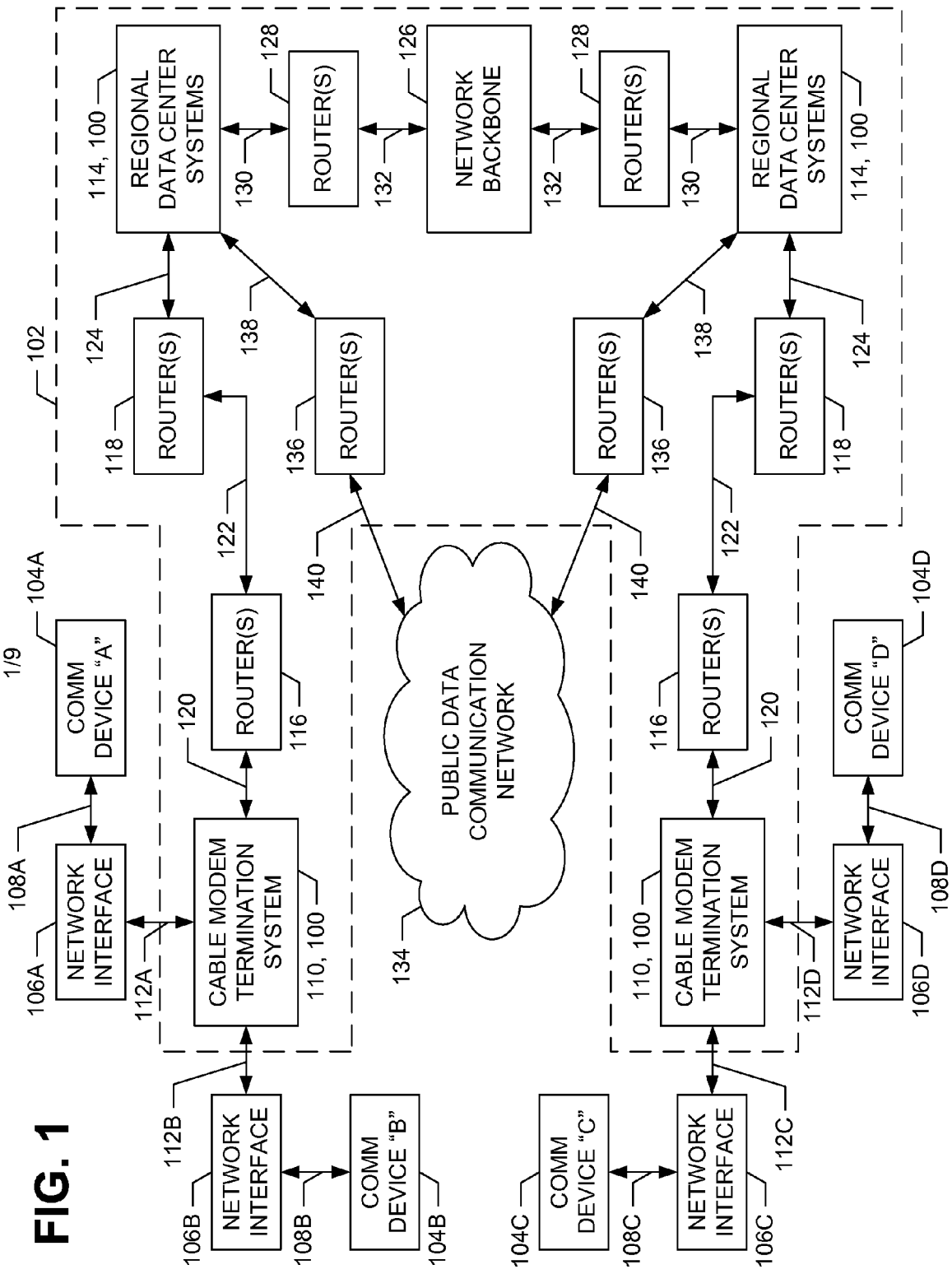
FIG. 1 displays a block diagram representation of a weighted data packet communication system and environment therefor in accordance with an example embodiment of the present invention.

Referring now to the drawings in which like numerals represent like elements or steps throughout the several views, FIG. 1 displays a block diagram representation of weighted data packet communication system 100 implemented in accordance with an example embodiment as a portion of a cable-based data communication network 102 operated by a communication service provider. The weighted data packet communication system 100 (the "system 100") communicates data packets between communication devices 104 connected to the data communication network 102 in both the upstream and downstream communication directions. In each communication direction, the data packets are communicated using apparatuses and methods, described in more detail below, that associate upstream and downstream weights (also sometimes referred to as "weight factors") with each respective communication device 104. The upstream and downstream weights are typically based on a tier, or level, of service selected by the subscriber owning and/or operating each respective communication device 104 and provided to each respective communication device 104 by the communication service provider. Communication devices 104 having a higher upstream weight relative to the upstream weights of other communication devices 104 receive preferential service when sending data in the upstream direction with multiple data packets being communicated upstream for each data packet communicated upstream for such other communication devices 104. Similarly, communication devices having a higher downstream weight relative to the downstream weights of other communication devices 104 receive preferential service when receiving data in the downstream direction with multiple data packets being communicated downstream for each data packet communicated downstream for such other communication devices 104. It should be appreciated that while upstream and downstream weights are typically based on tier, or level, of service in the example embodiment, upstream and downstream weights may be based on other parameters or factors in other embodiments. It should also be appreciated that while upstream and downstream weights are described in the example embodiment herein as being used to determine the relative numbers of data packets communicated, respectively, in the upstream and downstream communication directions for different communication devices 104, the upstream and downstream weights may be used in a similar manner in another embodiment to determine the relative number of bytes communicated, respectively, in the upstream and downstream communication directions for different communication devices 104.

The communication devices 104, according to the example embodiment, generally comprise computers that are capable of sending and receiving data in the form of data packets as necessary to communicate with each other and with other communication devices connected to the data communication network 102, but the communication devices 104 may, in other embodiments, comprise other devices existing now or in the future such as, without limitation, personal communication devices. Each communication device 104 has an assigned internet protocol (IP) address that is used to uniquely identify the communication device 104 from other communication devices 104 when sending or receiving data packets via data communication network 102. The communication devices 104 are connected to the system 100 by respective network interface devices 106 (also sometimes referred to herein as "network interfaces 106") for the upstream and downstream communication of data packets. The network interface devices 106, in the example embodiment, comprise cable modems that are communicatively connected to communication devices 104 via respective bi-directional communication links 108. Such communication links 108 include, without limitation, wired and/or wireless data communication paths. Each network interface device 106 has an assigned media control access (MAC) address that uniquely identifies the network interface device 106 from other network interface devices 106. The network interface devices 106 are also communicatively connected to cable modem termination systems 110 of system 100 by respective bi-directional communication links 112. Generally, bi-directional communication links 112 comprise wired communication paths provided by coaxial cable, but may be provided by optical fiber cable. In other embodiments, bi-directional communication links 112 may comprise wireless communication paths provided through the use of radio frequency (RF) signals, optical signals, and other forms of signals.

The cable modem termination systems 110, described in greater detail below, are typically distributed at various geographical locations with each providing upstream and downstream data packet communication services for many similarly located communication devices 104 connected thereto via network interface devices 106. For example and not limitation, a cable modem termination system 110 may be located at a cable headend that services communication devices 104 and network interface devices 106 in a particular geographical area. The cable modem termination systems 110 are communicatively connected, within the system 100 and data communication network 102, to regional data center systems 114 of the system 100 by one or more routers 116, 118 and bi-directional communication links 120, 122, 124 for the communication of upstream and downstream data packets between the cable modem termination systems 110 and the regional data center systems 114. Each regional data center system 114 is located to service and operate with a plurality of cable modem termination systems 110 located within a particular geographical region, or area, of the data communication network 102. Bi-directional communication links 120, 122, 124 typically comprise wired communication paths including optical fiber cables carrying optical signals representative of upstream and downstream data packets, but may also comprise wireless communication paths. Before proceeding further, it should be noted that as used herein, the term "upstream data packet" refers to a data packet being communicated from a sending to a receiving device in a communication direction generally away from a communication device 104. In contrast, the term "downstream data packet" refers to a data packet being communicated from a sending to a receiving device in a communication direction typically toward a communication device 104.

According to the example embodiment, the cable modem termination systems 110 apply the weights associated with each respectively connected communication device 104 to upstream and downstream data packet communications so as to provide preferential service to those subscribers (and their communication devices 104) who select and pay for such service. Application of the weights is performed by the cable modem termination systems 110 because, generally, most congestion within the data communication network 102 occurs between the cable modem termination systems 110 and communication devices 104 (and, hence, network interfaces 106) connected thereto. However, in other embodiments, other communication network devices such as, for example and not limitation, routers 116, 118 or other devices communicatively, logically, and/or physically positioned at locations other than those of the cable modem termination systems 110 may apply the weights to upstream and downstream data packets.

The system's regional data center systems 114 are communicatively connected to a network backbone 126 of the data communication network 102 via one or more routers 128 for the communication of upstream and downstream data packets between the regional data center systems 114 and the network backbone 126. Bi-directional communication links 130, 132 connect routers 128 respectively to the regional data center systems 114 and to the network backbone 126. Generally, the bi-directional communication links 130, 132 comprise wired communication paths including optical fiber cables carrying optical signals representative of upstream and downstream data packets, but may also comprise wireless communication paths.

The data communication network 102 is connected to a public data communication network 134 via routers 136 that are communicatively connected to respective regional data center systems 114 through bi-directional communication links 138 for the communication of upstream and downstream data packets therebetween. Routers 136 are communicatively connected to the public data communication network 134 for the communication of upstream and downstream data packets via bi-directional communication links 140. Generally, bi-directional communication links 138, 140 comprise wired communication paths including optical fiber cable, but may include other forms of wired and/or wireless communication paths. According to the example embodiment, the public data communication network 134 comprises the Internet.

Figure 2:
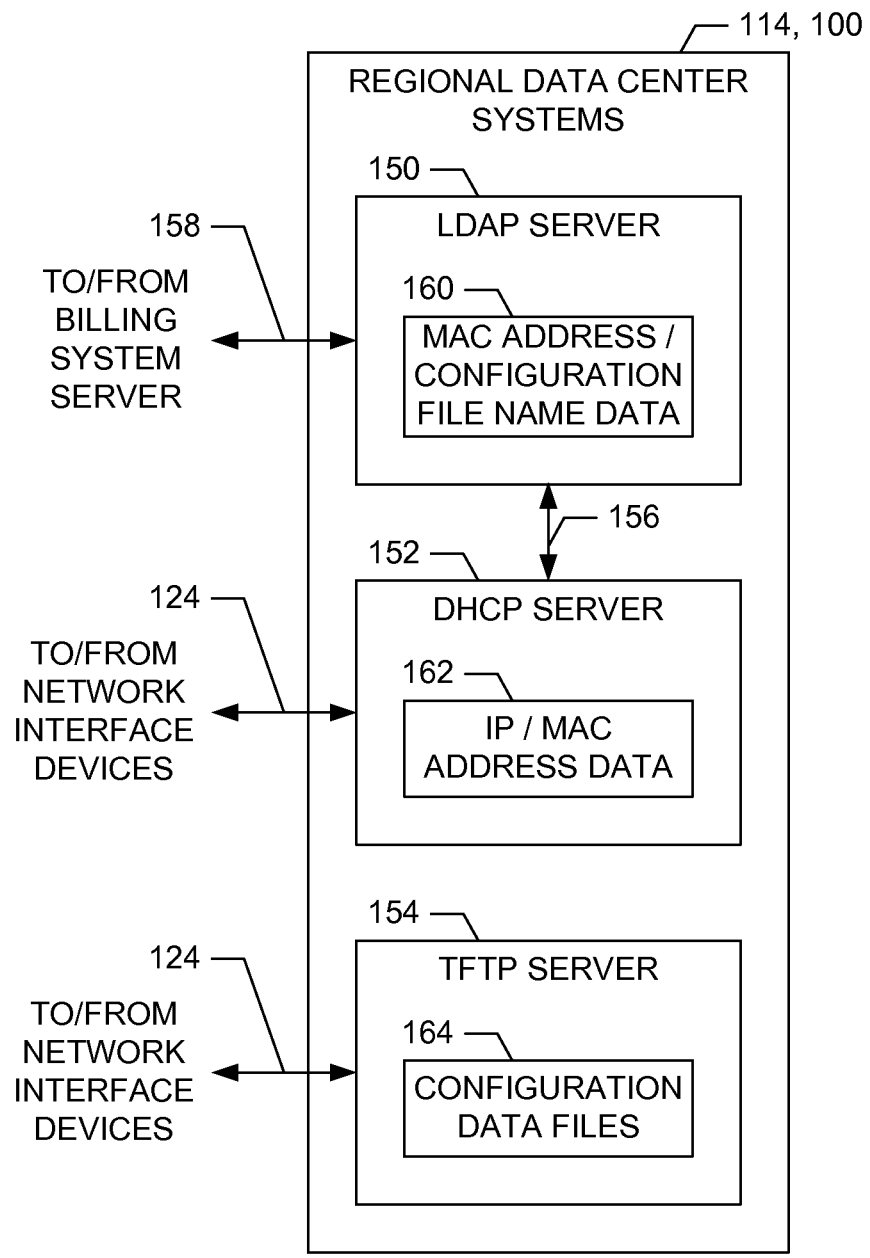
FIG. 2 displays a block diagram representation of certain regional data center systems in accordance with the example embodiment of the present invention.

FIG. 2 displays a block diagram representation of certain regional data center systems 114 in accordance with the example embodiment of the present invention. The regional data center systems 114 comprise a lightweight directory access protocol (LDAP) server computer 150, a dynamic host configuration protocol (DHCP) server computer 152, and a trivial file transfer protocol (TFTP) server computer 154. Together, the lightweight directory access protocol (LDAP) server computer 150, dynamic host configuration protocol (DHCP) server computer 152, and trivial file transfer protocol (TFTP) server computer 154, among other tasks and functions, maintain configuration information for and used by communication devices 104 and/or network interface devices 106. The configuration information is communicated to communication devices 104 and/or network interface devices 106 when the communication devices 104 and/or network interface devices 106 register and request such configuration information.

The lightweight directory access protocol (LDAP) server computer 150 (also sometimes referred to herein as an "LDAP server 150") is communicatively connected to the dynamic host configuration protocol (DHCP) server computer 152 and a billing system server computer (not shown) via respective communication links 156, 158. The billing system server computer determines the tier of service subscribed to by each subscriber and communicates data, from time-to-time, correlating each subscriber with a tier of service to the LDAP server 150. According to the example embodiment, the data comprises a media access control (MAC) address uniquely associated with and identifying a communication device 104 or network interface device 106 used by the subscriber and the name of a corresponding configuration data file storing configuration data for the communicate device 104 or network interface device 106. The LDAP server 150 receives the data from the billing system server computer and stores the data in a media access control (MAC) address/configuration file name data table 160. Upon request by the dynamic host configuration protocol (DHCP) server computer 152 and as described in more detail below, the LDAP server 150 retrieves data for a communication device 104 or network interface device 106 identified by the dynamic host configuration protocol (DHCP) server computer 152 and communicates the configuration data file name associated with the communication device 104 or network interface device 106 to the dynamic host configuration protocol (DHCP) server computer 152.

The dynamic host configuration protocol (DHCP) server computer 152 (also sometimes referred to herein as a "DHCP server 152") maintains an Internet protocol (IP)/media access control (MAC) address data table 162 storing data representative of address pairs having an Internet protocol (IP) address and a media access control (MAC) address. Each address pair is associated respectively and uniquely with a communication device 104 or network interface device 106 located within the geographical area serviced by the regional data center systems 114. The DHCP server 152 establishes, or configures, each address pair in response to receiving a request for configuration information from a communication device 104 or network interface device 106 when the communication device 104 or network interface device 106, as the case may be, attempts to register. Upon establishing and storing data corresponding to an address pair for a requesting communication device 104 or network interface device 106, the DHCP server 152 communicates data for the assigned Internet protocol (IP) address back to the communication device 104 or network interface device 106.

Additionally, when the DHCP server 152 receives a request for configuration information from a registering communication device 104 or network interface device 106, the DHCP server 152 generates and communicates to the LDAP server 150, a request for the name of the configuration file including configuration information for use by the registering communication device 104 or network interface device 106. According to the example embodiment, the request includes data corresponding to the media access control (MAC) address of the registering communication device 104 or network interface device 106. In response to receiving such request from the DHCP server 152 via communication link 156, the LDAP server 150 uses the data corresponding to the media access control (MAC) address of the registering communication device 104 or network interface device 106 as an index to the media access control (MAC) address/configuration file name data table 160 to retrieve the configuration file name associated with the registering communication device 104 or network interface device 106. The LDAP server 150 then communicates data corresponding to the retrieved configuration file name to the DHCP server 152 via communication link 156. After receiving such data from the LDAP server 150, the DHCP server 152 communicates such data to the registering communication device 104 or network interface device 106, as the case may be.

The trivial file transfer protocol (TFTP) server computer 154 (also sometimes referred to herein as a "TFTP server 154") stores a plurality of configuration data files 164 that each include data representative of, at least, upstream and downstream weights and modem speeds (or data transmission rates) for use by a communication device 104 or network interface device 106. Generally, each configuration data file 164 corresponds to a tier of service. Once a registering communication device 104 or network interface device 106 has received data corresponding to the name of a configuration data file 164 from the DHCP server 152 as described above, the registering communication device 104 or network interface device 106 fetches the configuration data file 164 (and, hence, the upstream and downstream weights and modem speeds or data transmission rates stored in the configuration data file 164) having that name from the TFTP server 154. The registering communication device 104 or network interface device 106 then communicates the data of the fetched configuration data file 164 to the communicatively connected cable modem termination system 110 that services the communication device 104 or network interface device 106. After receiving the data of the fetched configuration data file 164, the cable modem termination system 110 utilizes and applies the data corresponding to the upstream and downstream weights and modem speeds or data transmission rates as described herein.

Figure 3:
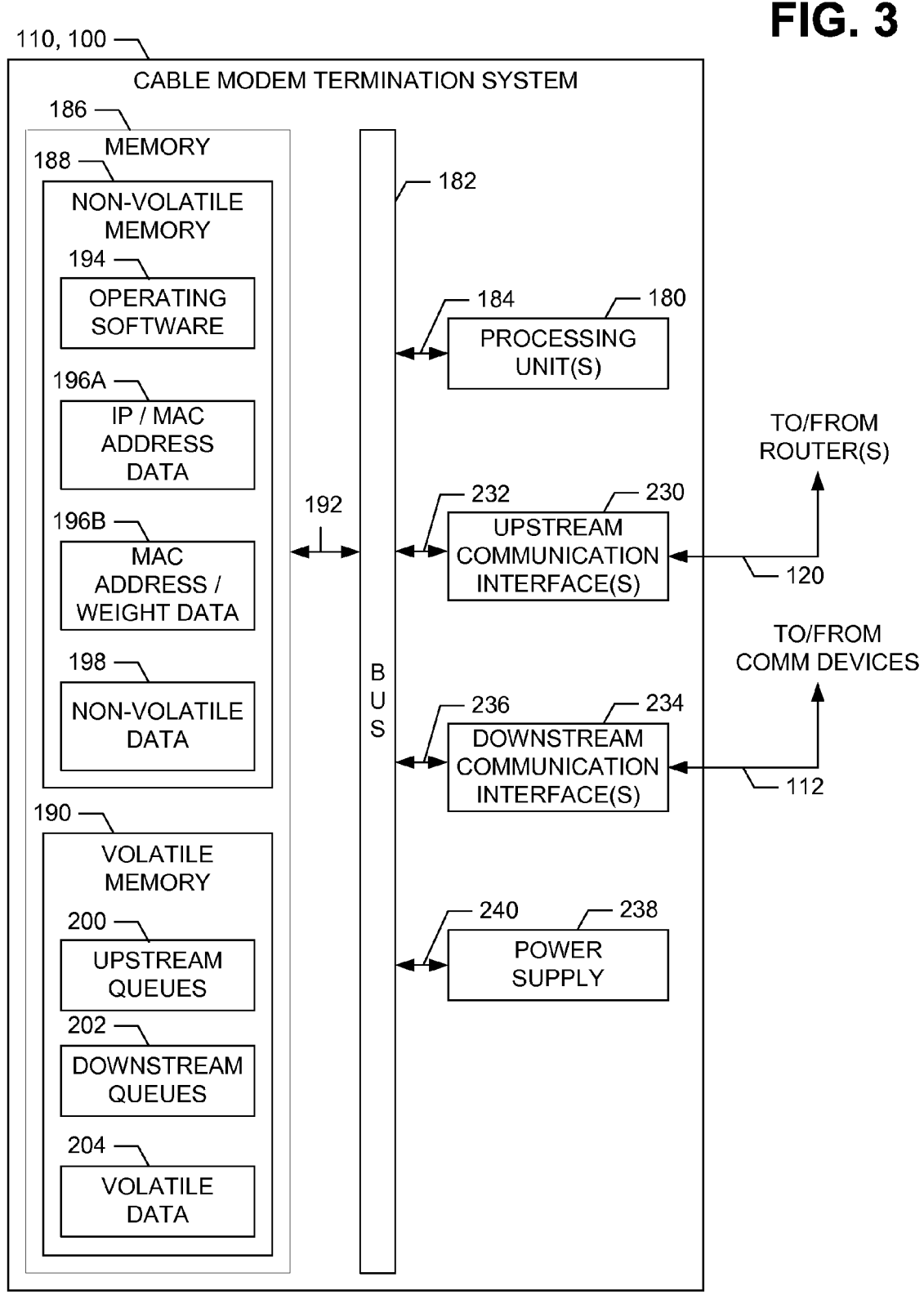
FIG. 3 displays a block diagram representation of a cable modem termination system in accordance with the example embodiment of the present invention.

FIG. 3 displays a block diagram representation of a cable modem termination system 110 in accordance with the example embodiment of the present invention. The cable modem termination system 110 controls and manages the communication of upstream and downstream data packets from/to communication and/or network interface devices 104, 106 serviced by the cable modem termination system 110 using a plurality of queues, or buffers, and configuration data provided by the regional data center systems 114 as described above. The cable modem termination system 110 comprises a processing unit 180 that is communicatively connected to a bus 182 via communication link 184 for the bi-directional communication of data with other components of the cable modem termination system 110. The processing unit 180 is adapted to execute computer software instructions, causing the cable modem termination system 110 to perform according to the various methods described herein, and to control and cause the weighted communication of data packets in the upstream and downstream directions relative to communication devices 104. The processing unit 180 may comprise a microprocessor, arithmetic logic unit (ALU), application specific integrated circuit (ASIC), or other similar electronic device having similar capabilities, alone or in combination. The bus 182 comprises a plurality of bi-directional communication paths for the bi-directional communication of computer software instructions, data, and various other control signals necessary for operation of the cable modem termination system 110.

The cable modem termination system 110 also comprises a memory 186, including non-volatile memory 188 and volatile memory 190. The memory 186 is communicatively connected to bus 182 for the bi-directional communication of computer software instructions, address, data and control signals with the bus 182 and other components connected to the bus 182 through one or more bi-directional communication links 192. Non-volatile memory 188 generally stores information and/or data that will not be lost when electrical power to the non-volatile memory 188 is removed. Examples of non-volatile memory include, without limitation, flash random access memory devices, battery backed up random access devices, read only memory devices, programmable read only memory devices, electrically programmable read only memory devices, magnetic disks, optical disks, and other similar or non-similar devices available now or in the future. Volatile memory 190 typically stores information and/or data for a temporary period of time, as such information and/or data that will be lost when electrical power is no longer supplied to the volatile memory 190. Examples of volatile memory include, but are not limited to, non-battery backed up random access memory devices.

According to the example embodiment, non-volatile memory 188 stores a plurality of computer software instructions of operating software 194 that, when delivered to and executed by processing unit 180, enable the processing unit 180 and other cable modem termination system components to perform various actions and implement the methods described herein. Non-volatile memory 188 also stores a plurality of data tables 196 including data received from regional data center systems 114 (by way of communication and/or network interface devices 104, 106 as described above) that operationally interact with and service the particular cable modem termination system 110. The data tables 196 comprise an Internet protocol (IP)/media access control (MAC) address data table 196A and a media access control (MAC) address/weight data table 196B. Non-volatile memory 188 additionally stores non-volatile data 198 that is used by the processing unit 180 during execution of the operating software 194.

The Internet protocol (IP)/media access control (MAC) address data table 196A includes an address pair for each communication device 104 and network interface device 106 that are communicatively connected to the cable modem termination system 110. The Internet protocol (IP) address of each address pair is typically assigned by the DHCP server 152 that services and operates with the communication device 104, network interface device 106, and cable modem termination system 110. The media access control (MAC) address of each address pair is assigned by the manufacturer of the communication device 104 or network interface device 106, as the case may be, at the time of manufacture. The address pair uniquely identifies a communication device 104 or network interface device 106, and enables the communication of data packets between the communication device 104 or network interface device 106 and the system 100. During such communication, the processing unit 180 of the cable modem termination system 110 may use the Internet protocol (IP) address associated with a particular communication device 104 or network interface device 106 to cross reference and look up the media access control (MAC) address for such communication device 104 or network interface device 106. Conversely, the processing unit 180 of the cable modem termination system 110 may use the media access control (MAC) address for a particular communication device 104 or network interface device 106 to cross reference and look up the Internet protocol (IP) address for such communication device 104 or network interface device 106.

The media access control (MAC) address/weight data table 196B includes upstream and downstream weights and a corresponding media access control (MAC) address for each communication device 104 and network interface device 106 that are communicatively connected to and serviced by the cable modem termination system 110. When the processing unit 180 of the cable modem termination system 110 requires an upstream or downstream weight for a particular communication device 104 or network interface device 106 with which a data packet is being communicated, the processing unit 180 uses the media access control (MAC) address of the particular communication device 104 or network interface device 106 as an index to look up and retrieve the upstream or downstream weight associated with the particular communication device 104 or network interface device 106 from the media access control (MAC) address/weight data table 196B.

In accordance with the example embodiment, the upstream and downstream weights (sometimes referred to as "weight factors") comprise numbers respectively associated with the upstream and downstream direction of data packet communication that are based at least on the tier of service associated with a particular communication device 104 or network interface device 106 by virtue of the owner and/or user of such communication device 104 or network interface device 106 subscribing to such tier of service with the communication service provider. The upstream weight associated with a first tier of service (and, hence, associated with a communication device 104A or network interface device 106A of a subscriber subscribing to the first tier of service) comprises the number of data packets for sending to intended recipients from such first tier communication device 104A or network interface device 106A that will be transmitted in the upstream direction during a communication cycle (described in more detail below) by a cable modem termination system 110 servicing such first tier communication or network interface device 104A, 106A relative to the number of data packets for sending to intended recipients from a second tier communication device 104B or network interface device 106B of a subscriber subscribing to a second tier of service and serviced by the same cable modem termination system 110 that will be transmitted in the upstream direction during the same communication cycle by such same cable modem termination system 110. Conversely, the downstream weight associated with a first tier of service (and, hence, associated with a first tier communication device 104A or network interface device 106A of a subscriber subscribing to the first tier of service) comprises the number of data packets for receipt by such first tier communication device 104 or network interface device 106 that will be transmitted in the downstream direction during a communication cycle by a cable modem termination system 110 servicing such first tier communication or network interface device 104A, 106A relative to the number of data packets for receipt by a second tier communication device 104B or network interface device 106B of a subscriber subscribing to a second tier of service and serviced by the same cable modem termination system 110 that will be transmitted in the downstream direction during the same communication cycle by such same cable modem termination system 110.

In further accordance with the example embodiment, the upstream and downstream weights may be based at least in part on the respective upstream and downstream data transmission speeds provided by and associated with the various tiers of service. For example and not limitation, a communication service provider may have two tiers of service with the first tier of service having upstream and downstream data transmission speeds of 1.5 megabits per second (Mbps) and 256 kilobits per second (Kbps), respectively, and the second tier of service having upstream and downstream data transmission speeds of 18 Mbps and 1,500 Kbps, respectively. Since the first tier of service has the lowest upstream and downstream data transmission speeds, an upstream weight having a value of one and a downstream weight having a value of one may be assigned for the first tier of service. The ratio of the upstream transmission speed for the second tier of service to that for the first tier of service may then be determined, which in the present example is 18 Mbps divided by 1.5 Mbps, or 12 to 1. Using this ratio of the upstream transmission speeds, an upstream weight having a value of 12 may be assigned for the second tier of service. Similarly, the ratio of the downstream transmission speed for the second tier of service to that for the first tier of service may be determined, which in the present example is 1,500 Kbps divided by 256 Kbps, or approximately 6 to 1. Using this ratio of the downstream transmission speeds, a downstream weight having a value of 6 may be assigned for the second tier of service.

Based on the weights described in the preceding paragraph, a cable modem termination system 110 providing communication services to a first communication device 104A on a first tier of service and to a second communication device 104B on a second tier of service will transmit in the upstream direction during a communication cycle, 12 data packets from the second communication device 104B for every 1 data packet from the first communication device 104A. The same cable modem termination system 110 will transmit in the downstream direction during a communication cycle, 6 data packets for receipt by the second communication device 104B for every 1 data packet for receipt by the first communication device 104A. Therefore, through the application and use of such weights, the cable modem termination system 110 provides preferential, higher data packet rate communication services to the second communication device 104B whose subscriber likely pays more to the communication service provider for such services under the second tier of service, as opposed to providing basic, lower data packet rate communication services to the first communication device 104A whose subscriber likely pays less to the communication service provider for such services under the first tier of service. It should be appreciated that in other embodiments, the upstream and downstream weights may be based on additional factors or considerations or on factors or considerations other than the upstream and downstream transmission speeds associated with tiers of service.

As noted above, the cable modem termination system 110 further includes a volatile memory 190 for storing volatile data. The volatile memory 190 stores data packets in upstream queues 200 and downstream queues 202, and volatile data 204 produced and/or used by the processing unit 180 during execution of the operating software 194. The upstream queues 200, as illustrated in FIG. 4, comprise a plurality of upstream device queues 206 and an upstream transmission queue 208. Each upstream device queue 206 is uniquely associated in one-to-one correspondence with a particular communication device 104 or network interface device 106 for which the cable modem termination system 110 provides communication services and temporarily stores data packets 210 received from such communication device 104 or network interface device 106, on a first in, first out ("FIFO") basis, for upstream transmission to intended recipients. Thus, as seen in FIG. 4, upstream device queue 206A is uniquely associated with communication device 104A and temporarily stores data packets 210A received from communication device 104A, while upstream device queue 206B is uniquely associated with communication device 104B and temporarily stores data packets 210B received from communication device 104B.

The upstream transmission queue 208 temporarily stores data packets 210 from each upstream device queue 206 until the data packets 210 are pulled from the upstream transmission queue 208, on a first in, first out ("FIFO") basis and transmitted by the cable modem termination system 110 in the upstream direction via communication link 120. According to the example embodiment, data packets 210 are placed into the upstream transmission queue 208 during a communication cycle in which the processing unit 180 pulls one or more data packets 210 from each upstream device queue 206 in a round robin manner and using the upstream weights stored in the media access control (MAC) address/weight data table 196B for the communication devices 104 or network interface devices 106 respectively associated with upstream device queues 206. Once the processing unit 180 has pulled the appropriate number of data packets 210 from each of the upstream device queues 206 and inserted the pulled data packets 210 into the upstream transmission queue 208 in the order in which the data packets 210 are pulled, the processing unit 180 loops back to the first upstream device queue 206 and repeats the process on the next communication cycle.

To further provide further description and understanding of the use and operation of the upstream queues 200, consider an example in which an upstream weight of 3 is stored in the media access control (MAC) address/weight data table 196B for communication device 104A and an upstream weight of 1 is stored in the media access control (MAC) address/weight data table 196B for communication device 104B. In this example and as seen in FIG. 4, the processing unit 180 will extract 3 data packets 210A from upstream device queue 206A and insert the extracted data packets 210A into the upstream transmission queue 208. Proceeding in a round robin manner to the next upstream device queue 206B, the processing unit 180 will then extract 1 data packet 210B from upstream device queue 206B and insert the extracted data packet 210B into the upstream transmission queue 208. If, as in this example, there are only two communication devices 104 serviced by the cable modem termination system 110, the processing unit 180 will have completed a communication cycle when the processing unit 180 inserts the extracted data packet 210B into the upstream transmission queue 208. The processing unit 180 then begins the next communication cycle by looping back to again pull 3 more data packets 210A from the first upstream device queue 206A and insert the pulled data packets 210A into the upstream transmission queue 208. If there were more than two communication devices 104 serviced by the cable modem termination system 110, the processing unit 180 would continue pulling and inserting data packets 210 in a similar manner from the remaining upstream device queues 206 during the current communication cycle before looping back to the first upstream device queue 206A to begin the next communication cycle.

The downstream queues 202, as illustrated in FIG. 5, comprise a plurality of downstream device queues 212 and a downstream transmission queue 214. Each downstream device queue 212 is uniquely associated in one-to-one correspondence with a particular communication device 104 or network interface device 106 for which the cable modem termination system 110 provides communication services. Each downstream device queue 212 receives data packets 216 from senders that are intended for delivery to the communication device 104 or network interface device 106 uniquely associated with the downstream device queue 212 and temporarily stores the received data packets 216, on a first in, first out ("FIFO") basis, for downstream transmission to such associated communication device 104 or network interface device 106. Thus, as displayed in FIG. 5, downstream device queue 212A is uniquely associated with communication device 104A and temporarily stores received data packets 216A intended for delivery to communication device 104A. Similarly, downstream device queue 212B is uniquely associated with communication device 104B and temporarily stores received data packets 216B intended for delivery to communication device 104B.

The downstream transmission queue 214 temporarily stores data packets 216 from each downstream device queue 212 until the data packets 216 are pulled from the downstream transmission queue 214, on a first in, first out ("FIFO") basis and transmitted by the cable modem termination system 110 in the downstream direction via appropriate communication links 112. According to the example embodiment, data packets 216 are inserted into the downstream transmission queue 214 during a communication cycle in which the processing unit 180 pulls one or more data packets 216 from each downstream device queue 212 in a round robin manner and using the downstream weights stored in the media access control (MAC) address/weight data table 196B for the communication devices 104 or network interface devices 106 respectively associated with downstream device queues 212. Once the processing unit 180 has pulled the appropriate number of data packets 216 from each of the downstream device queues 212 and inserted the pulled data packets 216 into the downstream transmission queue 214 in the order in which the data packets 216 are pulled, the processing unit 180 loops back to the first downstream device queue 212 and repeats the process on the next communication cycle.

In further description of the downstream queues 202, consider an example in which a downstream weight of 1 is stored in the media access control (MAC) address/weight data table 196B for communication device 104A and a downstream weight of 3 is stored in the media access control (MAC) address/weight data table 196B for communication device 104B. In this example and as seen in FIG. 5, the processing unit 180 will extract 1 data packets 216A from downstream device queue 212A and insert the extracted data packet 216A into the downstream transmission queue 214. Proceeding in a round robin manner to the next downstream device queue 212B, the processing unit 180 will then extract 3 data packets 216B from downstream device queue 212B and insert the extracted data packets 216B into the downstream transmission queue 214. If, as in this example, there are only two communication devices 104 serviced by the cable modem termination system 110, the processing unit 180 will have completed a communication cycle when the processing unit 180 inserts the extracted data packets 216B into the downstream transmission queue 214. The processing unit 180 then begins the next communication cycle by looping back to again pull 1 more data packet 216A from the first downstream device queue 212A and insert the pulled data packet 216A into the downstream transmission queue 214. If there were more than two communication devices 104 serviced by the cable modem termination system 110, the processing unit 180 would continue pulling and inserting data packets 216 in a similar manner from the remaining downstream device queues 212 during the current communication cycle before looping back to the first downstream device queue 212A to begin the next communication cycle.

Referring back to FIG. 3, the cable modem termination system 110 further comprises one or more upstream communication interfaces 230 communicatively coupled to bus 182 through bi-directional communication paths 232 for communicating information, data, and/or signals with other components of the cable modem termination system 110. Each upstream communication interface 230 is connected to and communicates with the remainder of data communication network 102 and, most directly, with routers 116 via bi-directional communication links 120. Through such connection and communication, the upstream communication interfaces 230 communicate data packets from communication devices 104 and/or network interface devices 106 in an upstream direction and receive data packets sent by other devices intended for receipt by communication devices 104 and/or network interface devices 106 in a downstream direction. According to the example embodiment, the upstream communication interfaces 230 are adapted to transmit and receive data packets in the form of optical signals and to convert received optical signals to electrical signals for communication via bi-directional communication paths 232 and bus 182. It should be appreciated, however, that in other embodiments, upstream communication interfaces 230 may be adapted to transmit and receive data packets in the form of electrical signals, magnetic signals, or other types of signals that may be utilized now or in the future.

The cable modem termination system 110 still further comprises one or more downstream communication interfaces 234 that are communicatively connected, via bi-directional communication paths 236, to bus 182 for the communication of information, data, and/or signals with the other components of the cable modem termination system 110. Each downstream communication interface 234 is connected to and communicates with network interface devices 106 (and, hence, communication devices 104) through bi-directional communication links 112. The downstream communication interfaces 234 receive data packets from communication devices 104 and/or network interface devices 106 for communication in an upstream direction and communicate data packets received from other devices to communication devices 104 and/or network interface devices 106 in a downstream direction. The downstream communication interfaces 234 are configured, in accordance with the example embodiment, to transmit and receive data packets in the form of electrical signals for communication through bi-directional communication paths 236 and bus 182. It should be understood, however, that downstream communication interfaces 234 may be configured, in other embodiments, to transmit and receive data packets in the form of optical signals, magnetic signals, or other signal types that may be used now or in the future.

In addition, the cable modem termination system 110 further comprises a power supply 238 connected to bus 182 via signal path 240 that supplies electrical energy to the various components of the cable modem termination system 110 at appropriate voltage and current levels. The power supply 238 is generally connected to an electrical power source such as an electrical power grid for the receipt of electrical power, and includes one or more rechargeable batteries for storing and supplying electrical energy for use in the event of a disruption in the supply of electrical power from the electrical power grid.

FIG. 6 displays a flowchart representation of a cable modem termination system initialization method 300 according to the example embodiment of the present invention. The cable modem termination system initialization method 300 (sometimes referred to herein as "method 300") is utilized by a cable modem termination system 110 to initialize for the weighted upstream and downstream communication of data packets. The cable modem termination system initialization method 300 is implemented by execution of an initialization program of the operating software 194 of a cable modem termination system 110 by a processing unit 180 thereof. Operation of a cable modem termination system 110 in accordance with method 300 generally starts when the cable modem termination system 110 is powered up or reset.

Upon starting at step 302, operation under method 300 advances to step 304 where the processing unit 180 sets ups the Internet protocol (IP)/media access control (MAC) address data table 196A and the media access control (MAC) address/weight data table 196B for subsequent population using configuration data received from communication devices 104 and/or network interface devices 106 as described herein. Continuing at step 306, the processing unit 180 sets up, or establishes, the upstream queues 200 and downstream queues 202 in volatile memory 190 for each communication device 104 or network interface device 106 with which the cable modem terminations system 110 communicates data packets. Such set up may include, for example and not limitation, allocating appropriate portions of volatile memory 190 for the queues 200, 202 and purging the queues 200, 202 of any potentially non-relevant or stray data. Then, at step 308, the processing unit 180 starts parallel and contemporaneous execution of respective programs of the operating software 194 that implement upstream data packet processing methods 350, 370, 400 and downstream data packet processing methods 420, 440, 470 described in more detail below. Subsequently, at step 310, operation of the cable modem termination system 110 in accordance with method 300 ends.

FIG. 7 depicts a flowchart representation of an upstream device queue loading method 350 in accordance with the example embodiment of the present invention. The upstream device queue loading method 350 (sometimes referred to herein as "upstream data packet processing method 350" or as "method 350") is implemented by a processing unit 180 of the cable modem termination system 110 through execution of a corresponding upstream device queue loading program of operating software 194. Once execution of the upstream device queue loading program has been started according to the cable modem termination system initialization method 300, the upstream device queue loading method 350 is continually performed by the cable modem termination system 110 to receive upstream data packets 210 from communication devices 104 and network interface devices 106 and to insert the received upstream data packets 210 into the upstream device queues 206 uniquely associated with the particular communication devices 104 or network interface devices 106 from which the upstream data packets 210 are received.

After starting operation according to the upstream device queue loading method 350 at step 352 thereof, a processing unit 180 of the cable modem termination system 110 receives an upstream data packet 210 from a communication device 104 or network interface device 106 via a communication link 112 at step 354. Next, at step 356 of method 350, the processing unit 180 determines which communication device 104 or network interface device 106 sent the upstream data packet 210. Then, at step 358, the processing unit 180 inserts the upstream data packet 210 into the upstream device queue 206 uniquely associated with the communication device 104 or network interface device 106. The processing unit 180 subsequently loops back to step 354 to receive another upstream data packet 210. Operating in this manner, each upstream device queue 206 is provided only with upstream data packets 210 that are communicated in the upstream direction by a communication device 104 or network interface device 106 uniquely associated with the upstream device queue 206.

FIG. 8 displays a flowchart representation of an upstream transmission queue loading method 370 according to the example embodiment of the present invention. The upstream transmission queue loading method 370 (sometimes referred to herein as "upstream data packet processing method 370" or as "method 370") is performed by a cable modem termination system 110 via execution of a corresponding upstream transmission queue loading program of operating software 194 by a processing unit 180. The upstream transmission queue loading method 370 is performed continually by the cable modem termination system 110 once execution of the upstream transmission queue loading program begins. Operating in accordance with the method 370, the processing unit 180 repeatedly cycles through the upstream device queues 206 in a round robin manner with each cycle comprising a communication cycle. During each communication cycle, the processing unit 180 pulls upstream data packets 210 from each upstream device queue 206 (if upstream data packets 210 are present therein) using the upstream weight associated with the upstream device queue 206 and with the communication device 104 or network interface device 106 to which the upstream device queue 206 is uniquely associated. The pulled upstream data packets 210 are then inserted, in the order pulled, into the upstream transmission queue 208.

Once execution of the upstream transmission queue loading program and operation in accordance with method 370 has begun at step 372 thereof, the processing unit 180 sets a communication device pointer to point to the first media access control (MAC) address present in the media access control (MAC) address/weight data table 196B at step 374. Proceeding to step 376, the processing unit 180 determines the weight stored in data table 196B for the media access control (MAC) address and, hence, the communication device 104 or network interface device 106 currently pointed to by the communication device pointer. Using the determined weight, the processing unit 180, at step 378, pulls the number of upstream data packets 210 corresponding to the weight from the upstream device queue 206 for the communication device 104 or network interface device 106 currently pointed to by the communication device pointer. Then, at step 380, the processing unit 180 inserts the pulled upstream data packets 210 into the upstream transmission queue 208 in the order in which the upstream data packets 210 were pulled from the respective upstream device queue 206.

Continuing at step 382, the processing unit 180 determines whether the communication device pointer is currently pointing to the last media access control (MAC) address present in the media access control (MAC) address/weight data table 196B and, therefore, the last communication device 104 or network interface device 104 for which an upstream device queue 206 exists. If so, the present communication cycle has been completed and the processing unit 180 loops back to step 374 to again set the communication device pointer to point to the first media access control (MAC) address present in the media access control (MAC) address/weight data table 196B and to begin the next communication cycle. If the processing unit 180 determines that the communication device pointer is not currently pointing to the last media access control (MAC) address present in the media access control (MAC) address/weight data table 196B, then the processing unit 180 sets the communication device pointer to point to the next media access control (MAC) address in the media access control (MAC) address/weight data table 196B at step 384 before returning to step 376 described above. The processing unit 180 and, hence, the cable modem termination system 110 continues to operate according to method 370 for so long as the cable modem termination system 110 is in operation.

FIG. 9 depicts a flowchart representation of an upstream transmission method 400 in accordance with the example embodiment of the present invention. The upstream transmission method 400 (sometimes referred to herein as "upstream data packet processing method 400" or as "method 400") is implemented by a processing unit 180 of the cable modem termination system 110 through execution of a corresponding upstream transmission program of operating software 194. In operating according to the upstream transmission method 400, the cable modem termination system 110 extracts upstream data packets 210 from the upstream transmission queue 208 and transmits the upstream data packets 210 in the upstream communication direction to their intended recipients. Once operation under the upstream transmission method 400 begins, the cable modem termination system 110 continues to perform according to the upstream transmission method 400 for as long as the cable modem termination system 110 is operating.

After starting at step 402 of method 400, the processing unit 180 pulls an upstream data packet 210 from the upstream transmission queue 208 at step 404. Then, at step 406, the processing unit 180 transmits the pulled upstream data packet 210 in the upstream communication direction via communication link 120 and the other components of data communication network 102 to its intended recipient. Subsequently, the processing unit 180 loops back to step 404 to extract the next upstream data packet 210 from the upstream transmission queue 208 and continue the upstream transmission of data packets. Because the upstream data packets 210 have been previously inserted into the upstream transmission queue 208 according to the upstream weights for the various sending communication devices 104 and network interface devices 106, the sending communication devices 104 and network interface devices 106 receive upstream data communications according to their subscribed to and associated with tier of service.

FIG. 10 displays a flowchart representation of a downstream device queue loading method 420 according to the example embodiment of the present invention. The downstream device queue loading method 420 (sometimes referred to herein as "downstream data packet processing method 420" or as "method 420") is implemented by a processing unit 180 of the cable modem termination system 110 executing a corresponding downstream device queue loading program of operating software 194. After the processing unit 180 has begun executing the downstream device queue loading program, the downstream device queue loading method 420 is performed by the cable modem termination system 110 in a continuous manner to receive downstream data packets 216 from senders that are intended for delivery to a communication device 104 or network interface device 106 serviced by the cable modem termination system 110 and to insert, or load, the received downstream data packets 216 into the downstream device queues 212 uniquely associated with the particular recipient communication devices 104 or network interface devices 106 for which the downstream data packets 216 are received.

Upon starting operation in accordance with the downstream device queue loading method 420 at step 422, a processing unit 180 of the cable modem termination system 110 receives, at step 424, a downstream data packet 216 from a sending communication device 104 or sending network interface device 106 via a communication link 112 or from another sending device via communication link 120. Next, at step 426 of method 420, the processing unit 180 determines which communication device 104 or network interface device 106 serviced by the cable modem termination system 110 is the intended recipient of the downstream data packet 216. The processing unit 180 may do so by extracting the Internet protocol (IP) address from the downstream data packet 216 and using the Internet protocol (IP) address as an index to look up the corresponding media access control (MAC) address in the Internet protocol (IP)/media access control (MAC) address data table 196A.

Proceeding to step 428 of method 420, the processing unit 180 inserts the downstream data packet 216 into the downstream device queue 212 uniquely associated with the communication device 104 or network interface device 106 that is the intended recipient of the downstream data packet 216. After loading the downstream data packet 216 into the appropriate downstream device queue 212, the processing unit 180 returns to step 424 to receive another downstream data packet 216 and to repeat operations according to method 420. By operating in this way, each downstream device queue 212 is supplied only with downstream data packets 212 that are communicated in the downstream direction and intended for receipt by a communication device 104 or network interface device 106 uniquely associated with the downstream device queue 212.

FIG. 11 depicts a flowchart representation of an downstream transmission queue loading method 440 in accordance with the example embodiment of the present invention. The downstream transmission queue loading method 440 (sometimes referred to herein as "downstream data packet processing method 440" or as "method 440") is performed by a cable modem termination system 110 via execution of a corresponding downstream transmission queue loading program of operating software 194 by a processing unit 180. The downstream transmission queue loading method 440 is performed in a continuous manner by the cable modem termination system 110 after execution of the downstream transmission queue loading program has begun. Operating according to method 440, the processing unit 180 repeatedly cycles through the downstream device queues 212 in a round robin manner with each cycle comprising a communication cycle. The processing unit 180, during each communication cycle, extracts downstream data packets 216 from each downstream device queue 212 (if downstream data packets 216 are present therein) using the downstream weight associated with the communication device 104 or network interface device 106 to which the downstream device queue 212 is uniquely associated. The extracted downstream data packets 216 are then inserted, in the order pulled from the respective downstream device queues 212, into the downstream transmission queue 214 for subsequent transmission to communication devices 104 or network interface devices 106.

After beginning execution of the downstream transmission queue loading program and beginning operation in accordance with method 440 at step 442 thereof, the processing unit 180 sets a communication device pointer to point to the first media access control (MAC) address present in the media access control (MAC) address/weight data table 196B at step 444. The processing unit 180, upon advancing to step 446, determines the weight stored in data table 196B for the media access control (MAC) address and, hence, the communication device 104 or network interface device 106 currently pointed to by the communication device pointer. Using the determined weight, the processing unit 180, at step 448, pulls the number of downstream data packets 216 corresponding to the weight from the downstream device queue 212 associated with the communication device 104 or network interface device 106 currently pointed to by the communication device pointer. Next, at step 450, the processing unit 180 inserts the pulled downstream data packets 216 into the downstream transmission queue 214 in the order in which the downstream data packets 216 were pulled from the respective downstream device queue 212.

Proceeding to step 452 of method 440, the processing unit 180 determines whether the communication device pointer is currently pointing to the last media access control (MAC) address present in the media access control (MAC) address/weight data table 196B and, therefore, the last communication device 104 or network interface device 104 for which downstream device queue 212 exists. If so, the processing unit 180 returns to step 444 (because the present communication cycle has been completed) to again set the communication device pointer to point to the first media access control (MAC) address present in the media access control (MAC) address/weight data table 196B and to begin the next communication cycle. If, at step 452, the processing unit 180 determines that the communication device pointer is not currently pointing to the last media access control (MAC) address present in the media access control (MAC) address/weight data table 196B, then the processing unit 180 sets the communication device pointer to point to the next media access control (MAC) address in the media access control (MAC) address/weight data table 196B at step 454 before returning to step 446 described above. The processing unit 180 and, hence, the cable modem termination system 110 continues to operate according to method 440 for so long as the cable modem termination system 110 is in operation.

Figure 12:
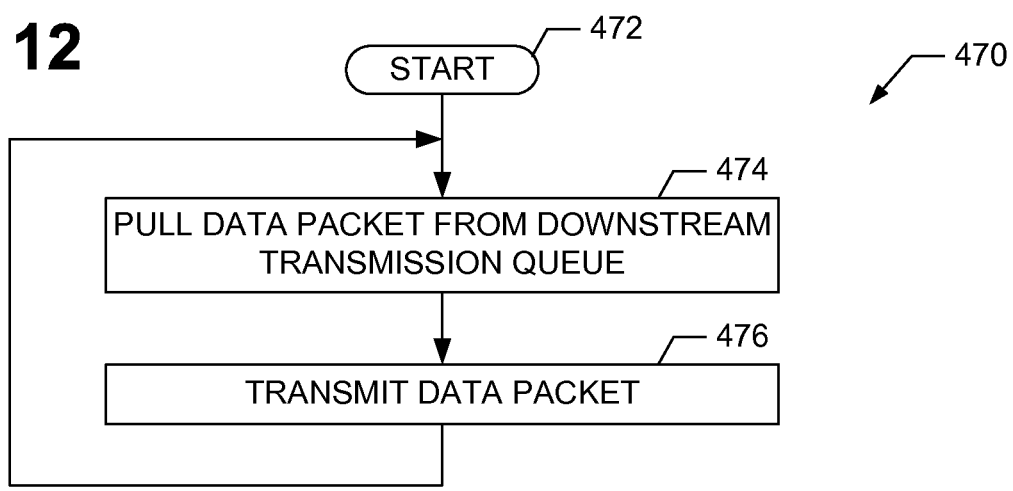
FIG. 12 displays a flowchart representation of a downstream transmission method in accordance with the example embodiment of the present invention.

FIG. 12 displays a flowchart representation of downstream transmission method 470 according to the example embodiment of the present invention. The downstream transmission method 470 (sometimes referred to herein as "downstream data packet processing method 470" or as "method 470") is implemented by a processing unit 180 of the cable modem termination system 110 through execution of a corresponding downstream transmission program of operating software 194. Through operation in accordance with the downstream transmission method 470, the cable modem termination system 110 extracts downstream data packets 216 from the downstream transmission queue 214 and transmits the downstream data packets 216 in the downstream communication direction to their intended recipients. After operation according to the downstream transmission method 470 begins, the cable modem termination system 110 continues to perform according to the downstream transmission method 470 for as long as the cable modem termination system 110 is operating.

Upon starting operation in accordance with the downstream transmission method 470 at step 472, the processing unit 180 pulls a downstream data packet 216 from the downstream transmission queue 214 at step 474. The processing unit 180 next transmits, at step 476, the extracted downstream data packet 216 in the downstream communication direction via a communication link 112 to its intended recipient communication device 104 or network interface device 106. Subsequently, the processing unit 180 returns to step 474 to extract the next downstream data packet 216 from the downstream transmission queue 214 and continue the downstream transmission of data packets. Because the downstream data packets 216 have been previously inserted into the downstream transmission queue 214 according to the downstream weights for the various receiving communication devices 104 and network interface devices 106, the receiving communication devices 104 and network interface devices 106 receive downstream data communications according to their subscribed to and associated with tier of service.

Whereas the present invention has been described in detail above with respect to an example embodiment thereof, it should be appreciated that variations and modifications might be effected within the spirit and scope of the present invention, as described herein before and as defined in the appended claims.

What is claimed is:

1. A method for communicating data packets in a weighted manner via a data communication network, the method comprising the steps of:
   selecting one or more data packets from a first sending device according to a predetermined first weight factor calculated based on a ratio of a plurality of tiers of service as subscribed to by at least a first and second user;
   consecutively transmitting the one or more data packets selected from the first sending device;
   selecting one or more data packets from a second sending device according to a pre-determined second weight factor calculated based on the ratio of upstream or downstream transmission speeds provided by and associated with the plurality of tiers of service as subscribed to by the at least first and second user; and
   consecutively transmitting the one or more data packets selected from the second sending device after consecutively transmitting the one or more data packets selected from the first sending device and absent an intervening transmitting of data packets from any other sending device.

2. The method of claim 1, wherein the first weight factor comprises a number received from a billing system, the number related to a tier of service associated with the first sending device.

3. The method of claim 2, wherein the first weight factor comprises a number related to an upstream data transmission rate for the tier of service associated with the first sending device.

4. The method of claim 1, wherein the second weight factor comprises a number related to a tier of service associated with the second sending device.

5. The method of claim 4, wherein the second weight factor comprises a number related to an upstream data transmission rate for the tier of service associated with the second sending device.

6. The method of claim 1, wherein the step of selecting one or more data packets from the first sending device comprises pulling the one or more data packets from a queue holding the one or more data packets in the order in which received from the first sending device.

7. The method of claim 6, wherein the queue is uniquely associated with the first sending device and holds only data packets from the first sending device.

8. The method of claim 6, wherein the queue comprises a first in, first out data buffer.

9. The method of claim 1, wherein the step of selecting one or more data packets from the second sending device comprises pulling the one or more data packets from a queue holding the one or more data packets in the order in which received from the second sending device.

10. The method of claim 9, wherein the queue is uniquely associated with the second sending device and holds only data packets from the second sending device.

11. The method of claim 9, wherein the queue comprises a first in, first out data buffer.

12. The method of claim 1, wherein the method further comprises, prior to the step of selecting one or more data packets from a first sending device, a step of receiving one or more data packets from the first sending device via a cable-based data communication network.

13. The method of claim 1, wherein the steps of selecting one or more data packets from a first sending device and selecting one or more data packets from a second sending device are performed in a round robin manner.

14. A method for communicating data packets in a weighted manner via a data communication network, the method comprising the steps of:
   consecutively transmitting one or more data packets received from a first device according to a pre-determined first weight factor calculated based on a ratio of a plurality of tiers of service as subscribed to by at least a first and second user; and
   consecutively transmitting one or more data packets received from a second device according to a pre-determined second weight factor calculated based on the ratio of upstream or downstream transmission speeds provided by and associated with the plurality of tiers of service as subscribed to by the at least first and second user after consecutively transmitting the one or more data packets received from the first device and absent an intervening transmitting of data packets received from any other device.

15. The method of claim 14, wherein the steps of consecutively transmitting one or more data packets received from a first device and consecutively transmitting one or more data packets received from a second device are performed in a round robin manner.

16. The method of claim 14, wherein the method further comprises, prior to the steps of consecutively transmitting, the steps of:
   inserting the one or more data packets received from the first device into a queue uniquely associated with the first device for storing only data packets received from the first device; and
   inserting the one or more data packets received from the second device into a queue uniquely associated with the second device for storing only data packets received from the second device.

17. The method of claim 14, wherein the pre-determined first and second weight factors are applied by a cable modem termination system.

18. The method of claim 14, wherein the pre-determined first and second weight factors are based at least on respective upstream data transmission rates to be provided to the first and second devices.

19. A method for communicating data packets in a weighted manner via a data communication network, the method comprising the steps of:
   selecting one or more data packets for a first receiving device according to a predetermined first weight factor calculated based on a ratio of a plurality of tiers of service as subscribed to by at least a first and second user;

consecutively transmitting the one or more data packets selected for the first receiving device;

selecting one or more data packets for a second receiving device according to a pre-determined second weight factor calculated based on a ratio of upstream or downstream transmission speeds provided by and associated with a plurality of tiers of service as subscribed to by the at least first and second user; and consecutively transmitting the one or more data packets selected for the second receiving device after consecutively transmitting the one or more data packets selected for the first receiving device and absent an intervening transmitting of data packets for any other receiving device.

20. The method of claim 19, wherein the first weight factor comprises a number related to a tier of service associated with the first receiving device.

21. The method of claim 20, wherein the first weight factor comprises a number related to a downstream data transmission rate for the tier of service associated with the first receiving device.

22. The method of claim 19, wherein the second weight factor comprises a number related to a tier of service associated with the second receiving device.

23. The method of claim 22, wherein the second weight factor comprises a number related to a downstream data transmission rate for the tier of service associated with the second receiving device.

24. The method of claim 19, wherein the step of selecting one or more data packets for the first receiving device comprises pulling the one or more data packets from a queue holding the one or more data packets in the order in which received for the first receiving device.

25. The method of claim 24, wherein the queue is uniquely associated with the first receiving device and holds only data packets for the first receiving device.

26. The method of claim 24, wherein the queue comprises a first in, first out data buffer.

27. The method of claim 19, wherein the step of selecting one or more data packets for the second receiving device comprises pulling the one or more data packets from a queue holding the one or more data packets in the order in which received for the second receiving device.

28. The method of claim 27, wherein the queue is uniquely associated with the second receiving device and holds only data packets for the second receiving device.

29. The method of claim 27, wherein the queue comprises a first in, first out data buffer.

30. The method of claim 19, wherein the method further comprises, prior to the step of selecting one or more data packets from a first sending device, a step of receiving one or more data packets from the first sending device via a cable-based data communication network.

31. The method of claim 19, wherein the steps of selecting one or more data packets for a first receiving device and selecting one or more data packets for a second receiving device are performed in a round robin manner.

32. A method for communicating data packets in a weighted manner via a data communication network, the method comprising the steps of:

consecutively transmitting one or more data packets received for a first device according to a pre-determined first weight factor calculated based on a ratio of a plurality of tiers of service as subscribed to by at least a first and second user; and consecutively transmitting one or more data packets received for a second device according to a pre-determined second weight factor calculated based on a ratio of upstream or downstream transmission speeds provided by and associated with the plurality of tiers of service as subscribed to by the at least first and second user after consecutively transmitting the one or more data packets received for the first device and absent an intervening transmitting of data packets received for any other device.

33. The method of claim 32, wherein the steps of consecutively transmitting one or more data packets received for a first device and consecutively transmitting one or more data packets received for a second device are performed in a round robin manner.

34. The method of claim 32, wherein the method further comprises, prior to the steps of consecutively transmitting, the steps of:

inserting the one or more data packets received for the first device into a queue uniquely associated with the first device for storing only data packets received for the first device; and inserting the one or more data packets received for the second device into a queue uniquely associated with the second device for storing only data packets received for the second device.

35. The method of claim 32, wherein the pre-determined first and second weight factors are applied by a cable modem termination system.

36. The method of claim 32, wherein the pre-determined first and second weight factors are based at least on respective downstream data transmission rates to be provided to the first and second devices.

37. An apparatus for communicating data packets in a weighted manner via a data communication network, said apparatus comprising:

a memory for storing data packets and for storing data representative of upstream and downstream weights associated respectively with each downstream device of a plurality of downstream devices, the upstream and downstream weights calculated based on a ratio of upstream or downstream transmission speeds provided by and associated with a plurality of tiers of service as subscribed to by at least a first and second user;

a communication interface for communicating data packets with the plurality of downstream devices using said data representative of said upstream and downstream weights to determine how many data packets are to be consecutively communicated with each downstream device during a cycle through such downstream devices relative to the number of data packets to be consecutively communicated with each other downstream device of said plurality of downstream devices during the same cycle; and a processing unit for moving data packets within said memory and between said memory and said communication interface.

38. The apparatus of claim 37, wherein said communication interface is further adapted for consecutively communicating data packets with each downstream device absent intervening communication of data packets with any other downstream device of said downstream devices.

39. The apparatus of claim 37, wherein said memory comprises a plurality of data buffers associated in a one-to-one correspondence with each downstream device of the plurality of downstream devices for storing data packets being communicated in the downstream direction toward the downstream devices.

40. The apparatus of claim 39, wherein memory further comprises a downstream transmission data buffer for receiving consecutive data packets from each data buffer of said plurality of data buffers in a round robin manner according to said data representative of downstream weights associated respectively with each downstream device of the plurality of downstream devices.

41. The apparatus of claim 37, wherein said memory comprises a plurality of data buffers associated in a one-to-one correspondence with each downstream device of the plurality of downstream devices for storing data packets being communicated in the upstream direction away from the downstream devices.

42. The apparatus of claim 41, wherein memory further comprises an upstream transmission data buffer for receiving consecutive data packets from each data buffer of said plurality of data buffers in a round robin manner according to said data representative of upstream weights associated respectively with each downstream device of the plurality of downstream devices.

43. The apparatus of claim 37, wherein said upstream and downstream weights associated respectively with each downstream device of the plurality of downstream devices are applied by a cable modem termination system.

44. The apparatus of claim 37, wherein said upstream weights associated respectively with each downstream device of the plurality of downstream devices are based at least in part on upstream communication rates respectively subscribed to with a communication service provider for each downstream device of the plurality of downstream devices.

45. The apparatus of claim 37, wherein said downstream weights associated respectively with each downstream device of the plurality of downstream devices are based at least in part on downstream communication rates respectively subscribed to with a communication service provider for each downstream device of the plurality of downstream devices.

* * * * *